(12) United States Patent
Header

(10) Patent No.: US 8,910,928 B2
(45) Date of Patent: *Dec. 16, 2014

(54) FLANGED MATERIAL AND STANDING SEAM CLAMP

(71) Applicant: Gregory A. Header, Richland, PA (US)

(72) Inventor: Gregory A. Header, Richland, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/091,062

(22) Filed: Nov. 26, 2013

(65) Prior Publication Data

US 2014/0086680 A1    Mar. 27, 2014

Related U.S. Application Data

(63) Continuation-in-part of application No. PCT/US2012/039283, filed on May 24, 2012, and a continuation of application No. 13/118,308, filed on May 27, 2011, now Pat. No. 8,528,888.

(51) Int. Cl.
*B23Q 3/02* (2006.01)
*E04D 13/10* (2006.01)
*F16B 2/06* (2006.01)
*F24J 2/52* (2006.01)

(52) U.S. Cl.
CPC ............. *F16B 2/065* (2013.01); *Y02E 10/47* (2013.01); *E04D 13/10* (2013.01); *F24J 2/5249* (2013.01)
USPC ............ 269/91; 52/24; 52/543; 52/698

(58) Field of Classification Search
USPC .......... 269/91, 165, 172, 203, 216, 239, 257; 24/513, 517, 489; 248/237; 52/547, 52/543, 24

IPC ................................................. E04D 13/00,1/34
See application file for complete search history.

(56) References Cited

U.S. PATENT DOCUMENTS

| | | | |
|---|---|---|---|
| 1,568,122 A | 1/1926 | Zifferer | |
| 2,815,557 A | 12/1957 | Jorgensen | |
| 2,985,174 A | 5/1961 | Guth | |
| 3,039,161 A | 6/1962 | Gagnon | |
| 3,964,149 A * | 6/1976 | Hugh | 29/261 |
| 4,901,963 A | 2/1990 | Yoder | |
| 4,901,964 A | 2/1990 | McConnell | |
| 6,442,805 B2 | 9/2002 | Pfister | |
| 6,536,166 B1 | 3/2003 | Alley | |
| 6,718,718 B2 | 4/2004 | Haddock | |
| 7,013,612 B2 | 3/2006 | Haddock | |
| 7,100,338 B2 | 9/2006 | Haddock | |

(Continued)

*Primary Examiner* — Lee D Wilson
*Assistant Examiner* — Jamal Daniel
(74) *Attorney, Agent, or Firm* — Shlesinger, Arkwright & Garvey LLP

(57) ABSTRACT

A clamping assembly for attaching loads to various kinds of flanged seams, the assembly comprising a generally U-shaped clamp body, at least one clamping hammer disposed interior of the clamp body, the clamping hammer is secured to the clamp body along the longitudinal axis of the clamp body, at least one adjustment screw extending through the clamp body and adapted to selectively impinge against the clamping hammer and cause it to pivot about its axis or otherwise move inwardly within the clamp body, the adjustment screw extending transverse to the longitudinal axis of the clamping hammer, at least one locking screw adapted to selectively impinge against the clamping hammer to prevent pivoting of the same may be optionally provided whereby a standing seam received within the clamp body may be tightly grasped between the clamp body and the clamping hammer under action of the adjustment screw.

30 Claims, 13 Drawing Sheets

(56) References Cited

U.S. PATENT DOCUMENTS

| | | |
|---|---|---|
| 7,127,852 B1 | 10/2006 | Dressler |
| 7,240,770 B2 | 7/2007 | Mullins et al. |
| 7,386,922 B1 | 6/2008 | Taylor et al. |
| 7,513,080 B1 | 4/2009 | Showalter |
| 7,703,256 B2 | 4/2010 | Haddock |
| 7,758,011 B2 | 7/2010 | Haddock |
| 8,038,106 B2 | 10/2011 | Magno, Jr. et al. |
| 8,070,119 B2 | 12/2011 | Taylor |
| 8,528,888 B2 | 9/2013 | Header |
| 2002/0088196 A1 | 7/2002 | Haddock |
| 2005/0102958 A1 | 5/2005 | Anderson |
| 2005/0257434 A1 | 11/2005 | Hockman |
| 2005/0284995 A1 | 12/2005 | Hutter, III |
| 2008/0302928 A1 | 12/2008 | Haddock |
| 2010/0012805 A1 | 1/2010 | Taylor |
| 2010/0058701 A1 | 3/2010 | Yao et al. |
| 2010/0284737 A1 | 11/2010 | McPheeters |
| 2011/0214367 A1 | 9/2011 | Haddock et al. |

* cited by examiner

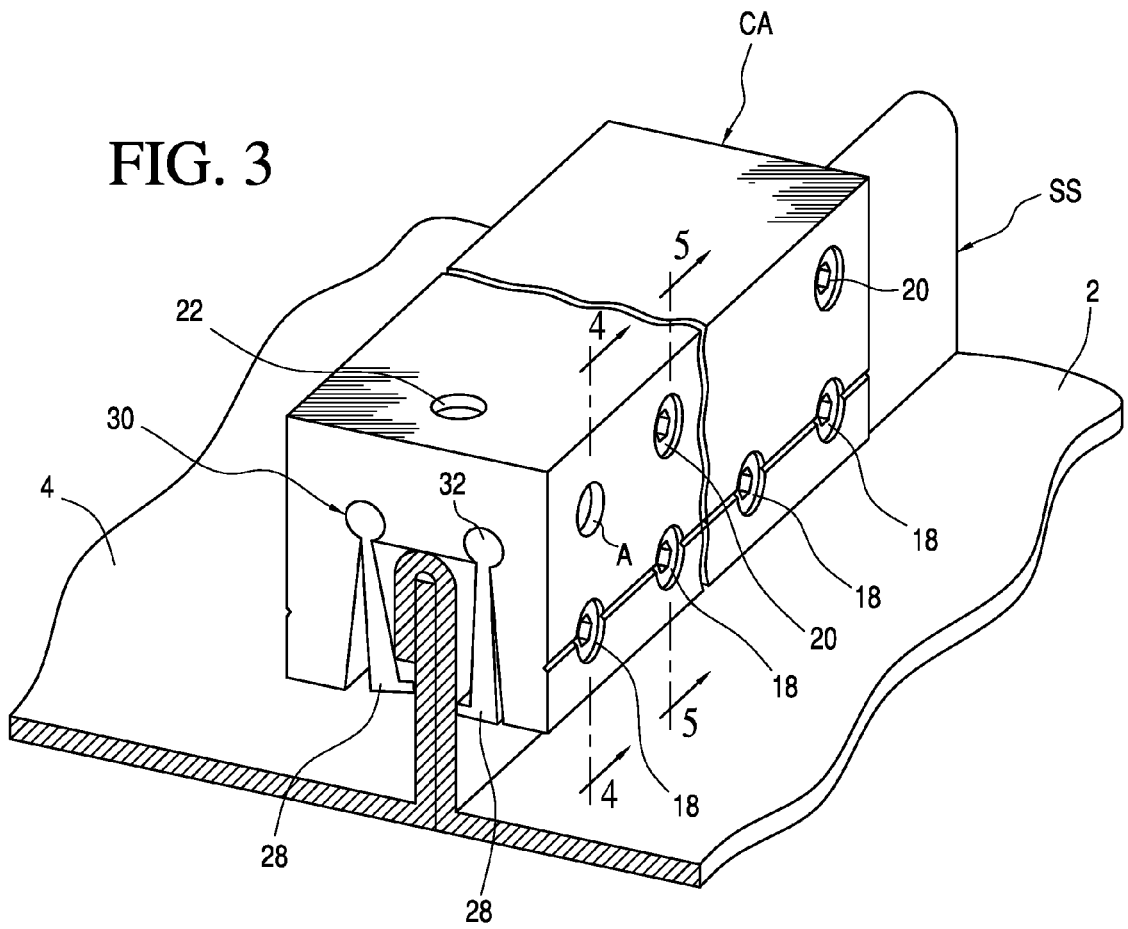

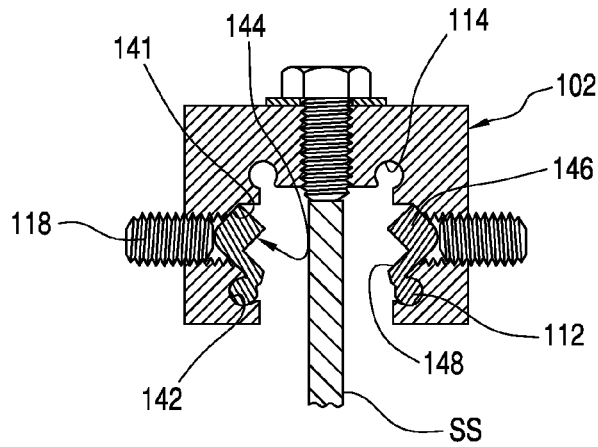
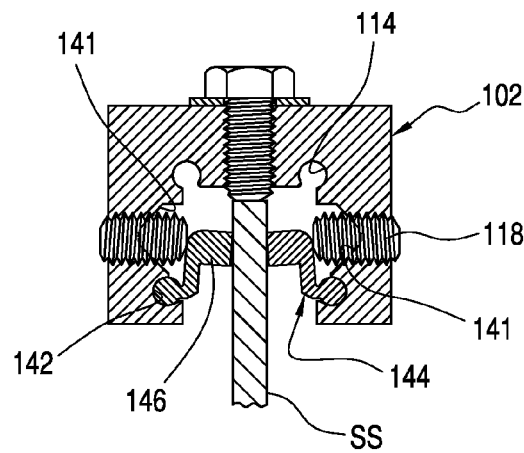
FIG. 17A  FIG. 17B
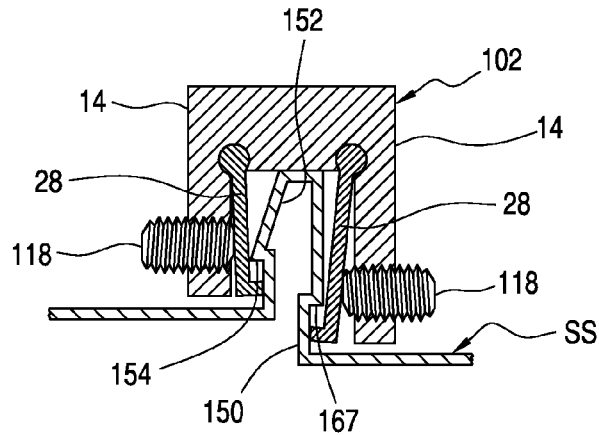
FIG. 18
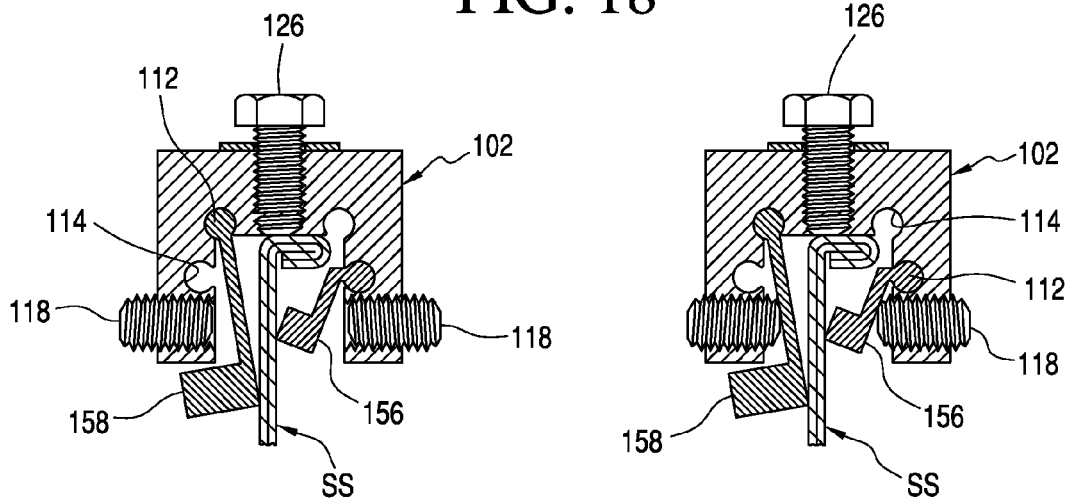
FIG. 19  FIG. 20

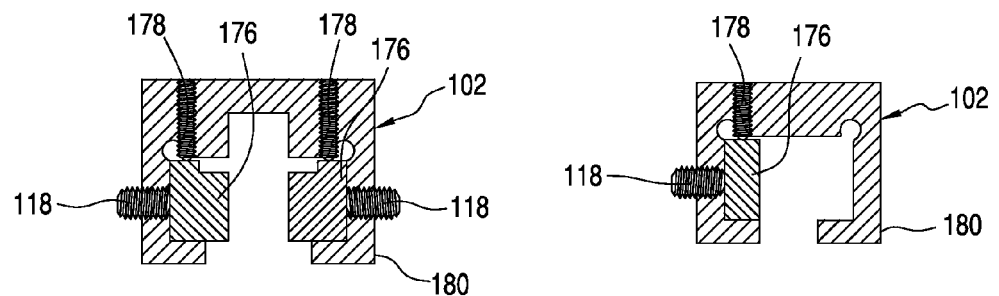
FIG. 26  FIG. 27A
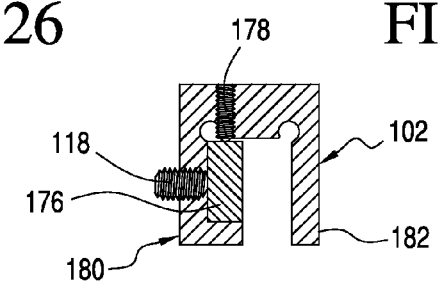
FIG. 27B
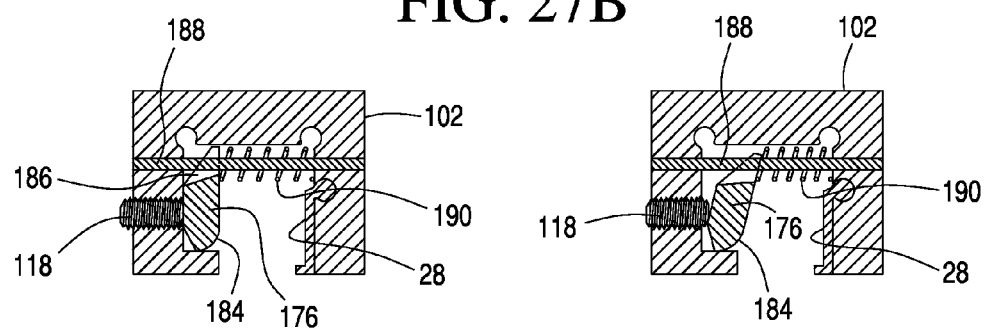
FIG. 28A  FIG. 28B
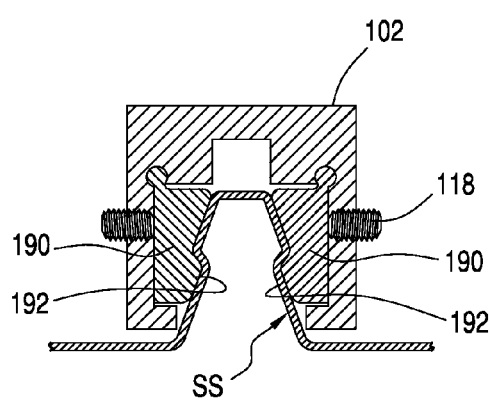 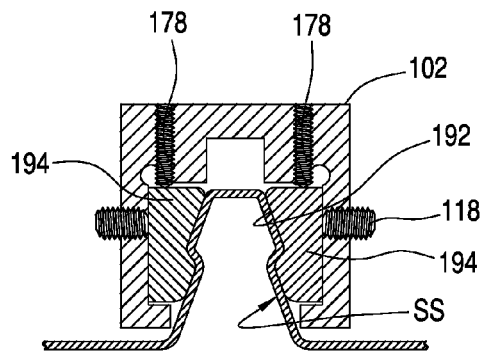
FIG. 29A  FIG. 29B

FLANGED MATERIAL AND STANDING SEAM CLAMP

CROSS-REFERENCE TO RELATED APPLICATIONS

This application is a continuation in part of International application No. PCT/US2012/039283, filed on May 24, 2012 and claiming priority on U.S. Ser. No. 13/118,308, filed on May 27, 2011, now U.S. Pat. No. 8,528,888 having an issue date of Sep. 10, 2013.

FIELD OF THE INVENTION

This invention is a clamp assembly for attaching loads to various kinds of flanged seams including, but not limited to, standing seam roofing.

BACKGROUND OF THE INVENTION

Standing seams are often used to interconnect metal panels to form the roof of a building or other structure. The seam is created by bending and profiling together adjacent side edges of two metal sheets to form an upwardly extending portion that interlocks the sheets as it extends the width or length of the roof surface. The head or uppermost portion of the seam may be formed in a variety of shapes depending upon the manner in which the sheets are profiled together. For example, the head of a standing seam may be L-shaped, T-shaped, rounded, doubled over or have some other profile correlating to the nature of end use.

It is desirable to attach a structure to a standing seam, especially in the case of roofing. Rooftops are obvious locations for mounting of solar panel arrays, walkways, plumbing, wiring or other ancillary structures including but not limited to snow catchers, ice dams, etc.

When attaching a structure to standing seam, drilling or penetration of the seam is avoided because doing so can affect the life of the roof. Clamp assemblies that do not penetrate a standing seam are known; however, these devices use bolts that are tightened directly against the seam which can damage the seam and ultimately affect the integrity of the roof. Prior art clamping assemblies also produce an uneven clamping pressure that is not evenly distributed against the seam eventually leading to clamp or roof failure. Many other roofs clamps are known, but in each of these cases the device is complicated and difficult to install quickly.

BRIEF SUMMARY OF THE INVENTION

The present invention is a clamping assembly comprising a generally U-shaped clamp body for receiving a standing seam, an I-beam or similar structure, either a pair of cooperating clamping hammers or a single clamping hammer are disposed interior of the clamp body, the clamping hammers are hingedly secured to the clamp body along a longitudinal axis of the body and each is provided with at least one adjustment screw adapted to movably extend through the clamp body and selectively impinge against the hammer and cause it to pivot about its axis to open and close the clamp, the adjustment screw being disposed transverse to the longitudinal axis of the clamping hammer, each clamping hammer is also provided with a typical or optional one locking screw that movably extends through the clamp body to selectively impinge against the hammer and prevent pivoting whereby a standing seam or other structure received within the clamp body may be tightly grasped between the pair of cooperating hammers (or single hammer) to clamp and lock it into place.

The present invention is also directed to a clamping assembly comprising a generally U-shaped clamp body comprising two interconnected body members for receiving a standing seam, an I-beam or similar structure, either a pair of cooperating clamping hammers or a single clamping hammer are disposed interior of the clamp body, the clamping hammers are hingedly secured to the clamp body along a longitudinal axis of the body and each is provided with at least one adjustment screw adapted to movably extend through the clamp body and selectively impinge against the hammer and cause it to pivot about its axis to open and close the clamp, the adjustment screw being disposed transverse to the longitudinal axis of the clamping hammer, each clamping hammer is also provided with at least one locking screw that movably extends through the clamp body to selectively impinge against the hammer and prevent pivoting whereby a standing seam or other structure received within the clamp body may be tightly grasped between the pair of cooperating hammers (or single hammer) to clamp and lock it into place.

The present invention is also directed to a clamping assembly comprising a generally U-shaped clamp body for receiving a standing seam, an I-beam or similar structure, either a pair of cooperating clamping hammers or a single clamping hammer are disposed interior of the clamp body, the clamping hammers are hingedly secured to bottom of the clamp body and each is provided with at least one adjustment screw adapted to movably extend through the clamp body and selectively impinge against the hammer and cause it to pivot upwardly about its axis to open and close the clamp, the adjustment screw being disposed transverse to the longitudinal axis of the clamping hammer, each clamping hammer may also provided with at least one locking screw that movably extends through the clamp body to selectively impinge against the hammer and prevent pivoting whereby a standing seam or other structure received within the clamp body may be tightly grasped between the pair of cooperating hammers (or single hammer) to clamp and lock it into place.

The present invention is also directed to clamping assembly comprising a generally U-shaped clamp body for receiving a standing seam, an I-beam or similar structure, either a pair of cooperating clamping hammers or a single clamping hammer that generally I-shaped in cross section and disposed interior of the clamp body within a longitudinal slot, the clamping hammers are fitted within the clamp body along a longitudinal axis of the body and each is provided with at least one adjustment screw adapted to movably extend through the clamp body and selectively impinge against one side of the hammer to cause it shift laterally open and close the clamp, the adjustment screw being disposed transverse to the longitudinal axis of the clamping hammer, each clamping hammer is also provided with an increased clamping surface area to provide contact against a seam to be clamped whereby a standing seam or other structure received within the clamp body may be tightly grasped between the pair of cooperating hammers (or single hammer) to clamp and lock it into place.

The present invention is also directed to a clamping assembly comprising a generally U-shaped clamp body for receiving a standing seam, an I-beam or similar structure, either a pair of cooperating clamping hammers or a single clamping hammer are disposed interior of the clamp body, the clamping hammers comprise a block fitted with a washer and rivet secured to the clamp body along a longitudinal axis of the body and each is provided with at least one adjustment screw fixed at one end thereof to the washer and rivet and adapted to movably extend through the clamp body and selectively impinge against the block to cause it to travel inwardly within the clamp to clamp a standing seam, the adjustment screw being disposed transverse to the longitudinal axis of the clamping block. In the alternative, the washer and rivet may be replaced with a free spinning washer and nut to move the clamping block.

BRIEF DESCRIPTION OF THE SEVERAL VIEWS OF THE DRAWINGS

FIG. 3 is perspective view of the clamp shown in FIG. 2 when clamping standing seam with portions of the clamp shown in broken lines;

FIG. 4 is a cross-sectional view taken along lines 4-4 of FIG. 3;

FIG. 5 is a cross-sectional view taken along lines 5-5 of FIG. 3;

FIG. 17A is a cross-sectional view showing an alternative embodiment of the clamp according to the present invention and prior to securing to a standing seam;

FIG. 17B is a cross-sectional view showing an alternative embodiment of the clamp according to the present invention when securing to a standing seam;

FIG. 18 is a cross-sectional view showing another alternative embodiment of the clamp according to the present invention when securing to a standing seam;

FIG. 19 is a cross-sectional view showing an alternative embodiment of the clamp according to the present invention prior to securing to an L-shaped standing seam;

FIG. 20 is a cross-sectional view showing an alternative embodiment of the clamp according to the present invention when secured to an L-shaped standing seam;

FIG. 26 is a cross-sectional view showing an alternative embodiment of the clamp according to the present invention;

FIG. 27A is a cross-sectional view showing an alternative embodiment of the clamp shown in FIG. 26;

FIG. 27B is a cross-sectional view showing an alternative embodiment of the clamp shown in FIG. 26;

FIG. 28A is a cross-sectional view showing an alternative embodiment of the clamp according to the present invention prior to clamping;

FIG. 28B is a cross-sectional view showing the clamp in FIG. 23A when in a clamping position;

FIG. 29A is a cross-sectional view showing an alternative embodiment of the clamp according to the present invention;

FIG. 29B is a cross-sectional view showing an alternative embodiment of the clamp shown in FIG. 29A;

DETAILED DESCRIPTION OF THE INVENTION

Figure 1:
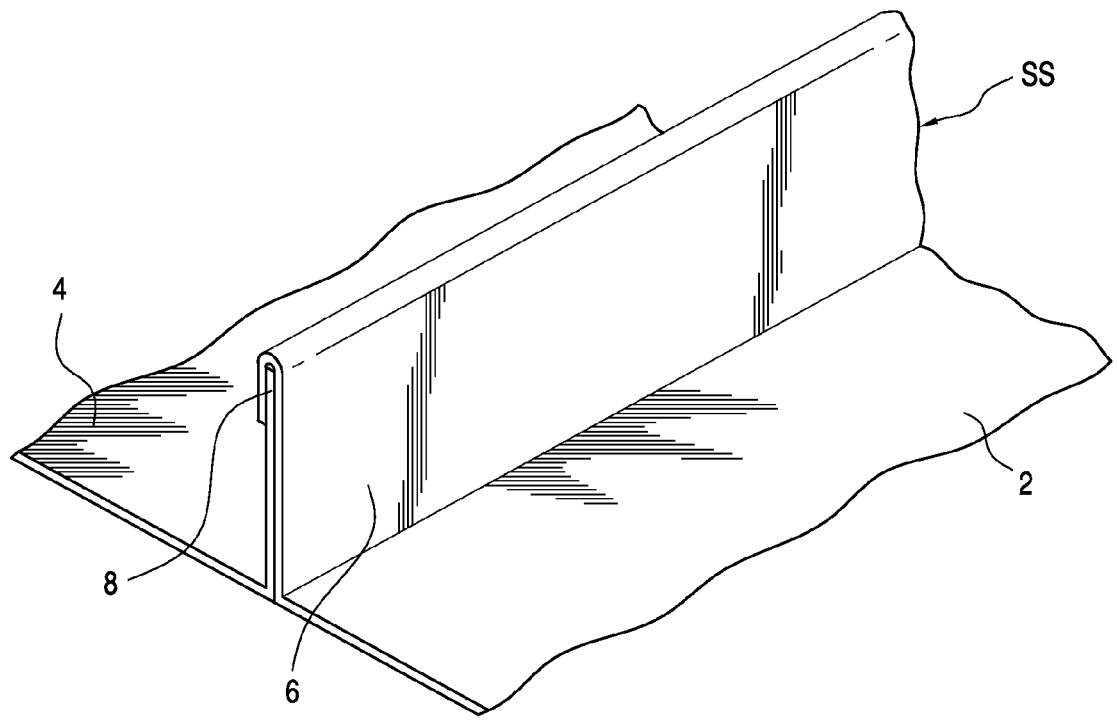
FIG. 1 is a perspective view showing a typical overlap type standing seam that may be clamped by the present invention.

FIG. 1 shows a standard overlap-type standing seam SS comprising metal sheets 2 and 4 interconnected at upstanding portion 6 and head portion 8. The standing seam SS is formed by bending or profiling together adjacent edges of sheets 2 and 4 to interlock the edges at head portion 8 in a known manner. The present invention is applicable for clamping other standing seams as will be explained further below.

Figure 2:
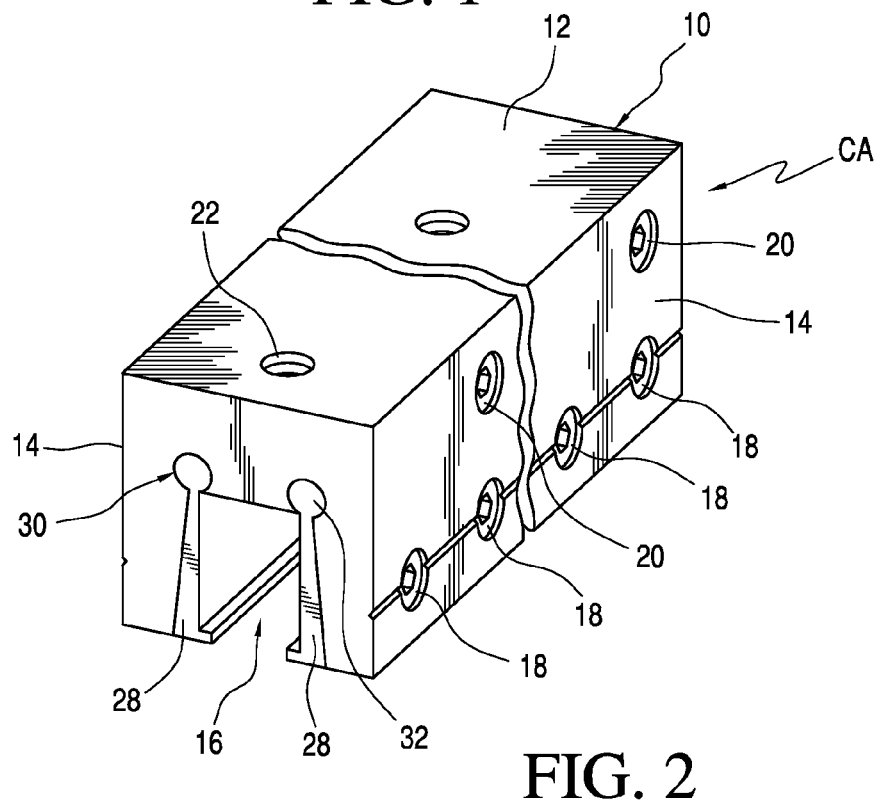
FIG. 2 is a perspective view showing the clamp assembly according to the present invention with portions broken away.

Referring to FIGS. 2 through 5, the clamp assembly CA of the present invention is shown in greater detail. As best seen in FIG. 2, the clamp assembly CA comprises a generally U-shaped clamp body 10, formed from metal such as extruded aluminum or a high density plastic or other material, and having a top 12 and sides 14 that define an interior region 16 for receiving a standing seam. The clamp body 10 may be of variable length and thickness depending upon the end use of the clamp and the strength requirements necessary for that particular use.

Adjustment screws 18 are provided along both sides 14 of the clamp body. The apertures for each of the adjustment screws 18 are disposed adjacent the bottom edge of each side 14 and each extends through the sides 14 so such that the adjustment screw may be selectively moved into and out of interior region 16 of the clamp body.

Locking screws 20 may be provided along both sides 14 of the clamp body. The apertures for each of the locking screws 20 are disposed adjacent the top edge of each side 14 and each extends through the sides 14 so that it can be selectively moved into and out of the interior region 16 of the clamp body to lock the clamp onto a seam as will be further explained below. The number of locking screws 20 and adjustment screws 18 provided on the clamp is variable. In general, the clamp body 10 will have a pair of adjustment screws on each of side of the clamp, the pairs aligned as mirror images and at least one locking screw per side.

A threaded aperture 22 is provided within the top 12 of the clamp body 10 to receive a threaded bolt (not shown) that may be used to attach a solar panel, wiring or other structure to the clamp body. Similarly, and as best shown in FIGS. 3 and 4, a threaded aperture A may be provided in either or both of the sides 14 of the clamp body to receive a threaded bolt (not shown) to attach a solar panel, wiring, or some other structure to the clamp body.

Turning to FIGS. 3 through 5, additional features of the clamp assembly CA are shown together with operation of the clamp. The interior region 16 comprises side walls 24 and top wall 26. The width and height of interior region 16 may be varied depending upon the size of the standing seam to be clamped.

A pair of movable clamping jaws or hammers 28 are provided within interior region 16 of the clamp body 10 for clamping against a seam. As best shown in FIGS. 4 and 5, the clamping hammers are disposed as mirror images of each other and in one embodiment, are generally L-shaped to accommodate the head portion of a conventional folded seam as will be further explained below. The hammers 28 extend the length of the clamp body 10 from a first end to a second end and are pivotally secured within the clamp body at hinge member 30. The hammers may be constructed from metal, such as extruded aluminum, or from a high density plastic or other material suitable to the use of the clamp.

Hinge member 30 comprises a cylindrical member 32, provided at the top of the clamping hammer 28 and extending the length of the hammer, and a cooperating groove 34 provided within the clamp body, the groove 34 sized to receive the cylindrical member 32 such that hammer 28 is adapted to freely pivot about the longitudinal axis of hinge member 30. During assembly of the clamp, a series of inwardly extending detents (not shown) may be provided at each end of the groove 34 to retain the clamping hammer 28 within the groove 34.

As best shown in FIG. 4, the adjustment screws 18 are aligned transverse to the longitudinal axis of the clamping hammers 28. Selectively turning the adjustment screw 18 will cause it to move inwardly or outwardly and consequently, into and out of engagement with a respective clamping hammer 28. When a standing seam SS is disposed interior of clamp body 10 and the adjustment screws 18 associated with the clamping hammers 28 are turned inwardly, the hammers are likewise caused to pivot inwardly about hinge 30 and engage against the upstanding portion 6 of a seam SS. The L-shape of the clamping hammers 28 allow the head portion 8 of the seam to be received between the hammers without damaging the head. The present invention generates a clamping pressure against the seam that is continuous and evenly distributed along the entire length of the clamp assembly. By spreading the load along the length of the clamp, damage to the seam is avoided and failure of the clamp is greatly reduced.

As best shown in FIG. 5, after the seam SS is engaged by the clamping hammers, the locking screws 20 associated with each of the hammers are tightened which causes the screw to contact cylindrical member 32 and prevent pivoting of hinge 30 which is then in a locked position. As is apparent, to remove the assembly from a seam, the adjustment and locking screws are loosened which causes the hammers to pivot out of engagement thereby allowing the clamp to be separated from the seam.

Figure 6:
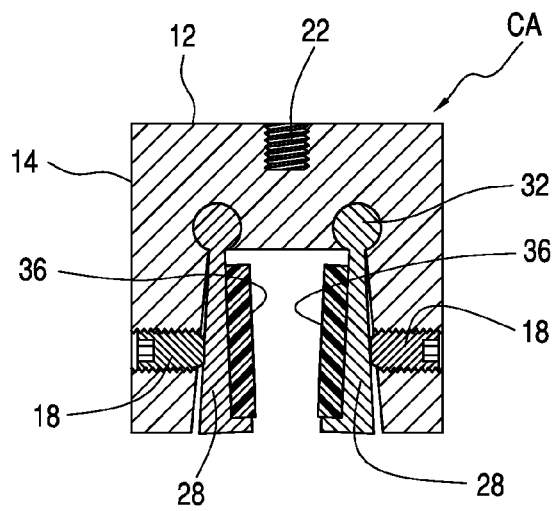
FIG. 6 is a cross-sectional view of an alternative embodiment of the clamp assembly shown in FIG. 4.

FIG. 6 illustrates an alternative embodiment of the present invention whereby the inwardly facing surfaces of the clamping hammers 28 have secured to the surfaces an elastomeric coating (or a sheet) of material to provide an isolation gasket, membrane or filler material 36 for purposes of, for example, increased friction, dampening vibration or providing insulation to the clamped seam or otherwise function as a spacer.

Figure 7:
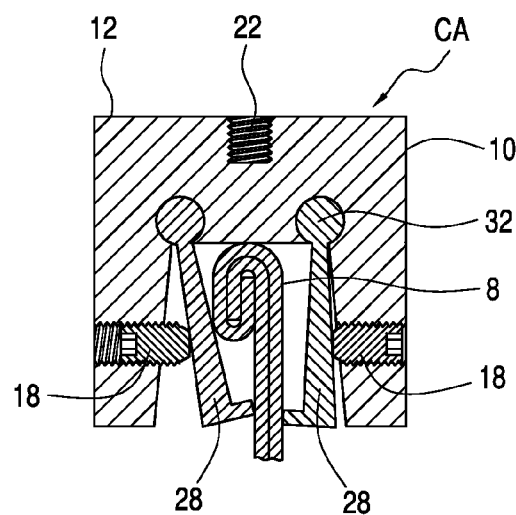
FIG. 7 is cross sectional view of the clamp shown in FIG. 4 when clamping a double lock type standing seam.

FIG. 7 illustrates the clamp assembly of the present invention when clamped to a double lock standing seam. In this embodiment, the clamping hammers are angled inwardly to a greater degree than would be the case with an overlap type standing seam. The invention is adapted to accommodate different kinds of seams having varying shapes and head sizes.

Figure 8:
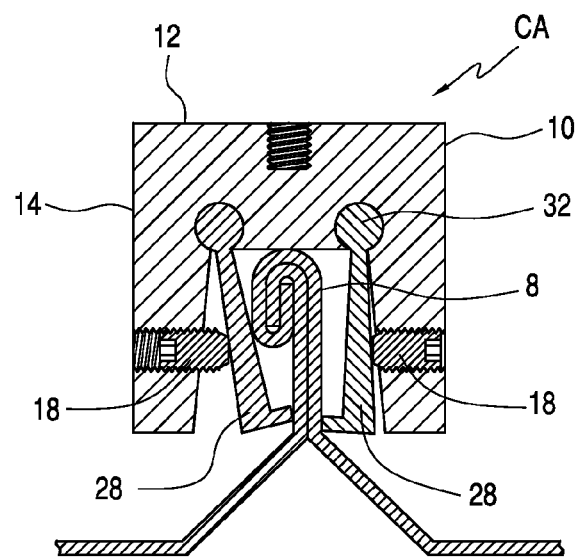
FIG. 8 is cross-sectional view of the clamp shown in FIG. 4 when clamping a trapezoid double lock type standing seam.

FIG. 8 illustrates the clamp assembly of the present invention when clamping to a trapezoid double lock type standing seam.

Figure 9:
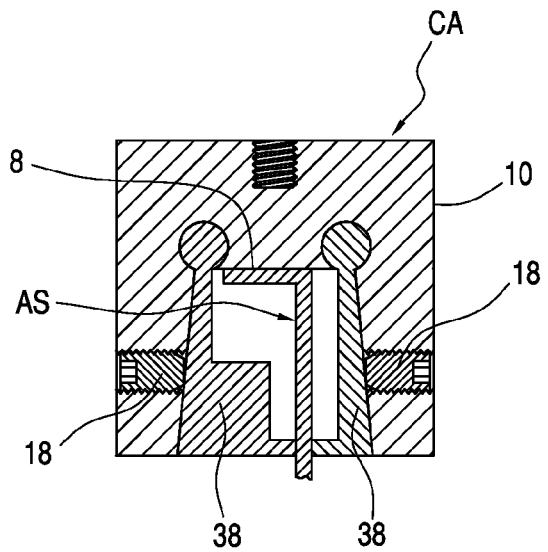
FIG. 9 is a cross-sectional view showing an alternative embodiment of the clamp shown in FIG. 4 when clamping an angled seam.

FIG. 9 illustrates an alternative embodiment of the present invention. The clamping hammer 28 noted earlier are interchanged in this embodiment to adapt the clamp assembly CA to clamp an angled seam AS. In this embodiment, one of the two clamping hammers in FIGS. 2 through 5 is replaced with an angled seam clamping hammer 38. The angled seam clamping hammer 38 is shown to have a stepped configuration to accommodate the head portion 8 of the angled seam AS which extends transverse to the longitudinal axis of the seam.

Figure 10:
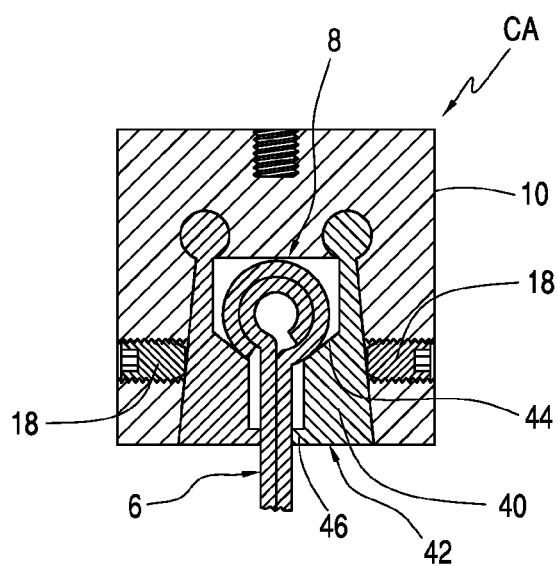
FIG. 10 is a cross-sectional view showing an alternative embodiment of the clamp shown in FIG. 4 when clamping a seam having a round head.

FIG. 10 illustrates a further embodiment of the present invention. Both clamping hammers in this embodiment are changed from that shown in the previous embodiments so as to adapt the clamp assembly CA for clamping a seam having a round head 8. The round head clamping hammers 42 include an abutment region 40 that extends inwardly and includes a downwardly sloping surface 44 for engaging the lower regions of the rounded head 8 and jaw portions 46 for engaging the upstanding portion of the seam.

Figure 11:
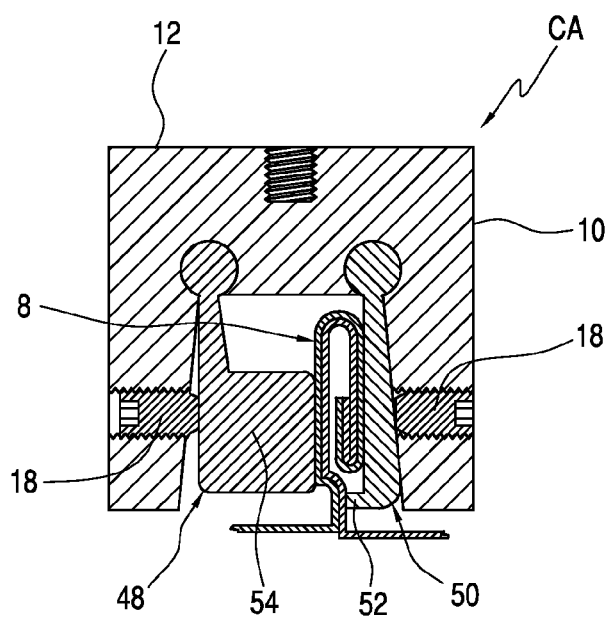
FIG. 11 is a cross-sectional view showing an alternative embodiment of the clamp shown in FIG. 4 when clamping an off-set seam.

FIG. 11 illustrates another embodiment of the present invention. Both clamping hammers in this embodiment are changed from that shown in the previous embodiments so as to adapt the clamp assembly CA for clamping a seam having an offset head 8. The offset head clamping hammers 48 and 50 have different thicknesses and heights. Offset head clamping hammer 50 has a greater height than offset head clamping hammer 48 and further includes a jaw portion 52. Offset head clamping hammer 48 includes a thickened region or abutment 54 so that when the hammers are urged against the offset head 8, it is held securely between both hammers and the top 12 of the clamp body is maintained parallel to the surface from which the seam extends.

Figure 12:
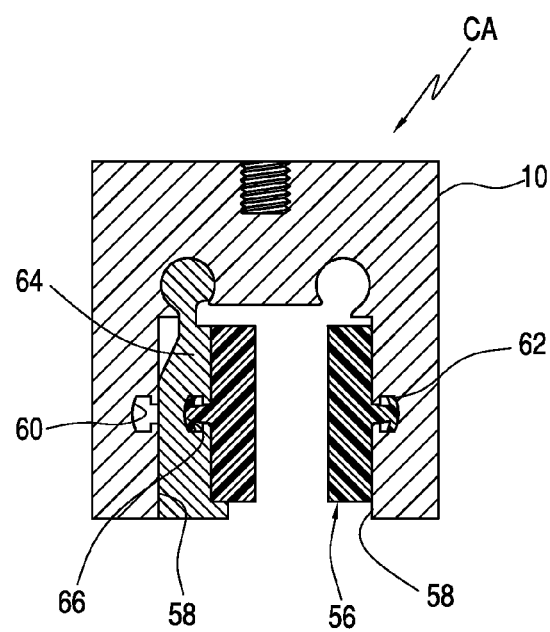
FIG. 12 is a cross-sectional view showing an alternative embodiment of the clamp according to the present invention with a pair of protective gaskets.

FIG. 12 illustrates another embodiment of the present invention. In this embodiment, the interior wall surfaces 58 of the clamp body 10 are provided with parallel keyway tracks 60 extending the length of the clamp for selectively receiving a gasket or membrane 56 having a male keyway portion 62 adapted to interfit and interlock the keyway track 60. A modified clamping hammer 64 is provided at the opposite side of the gasket or membrane 56. The modified clamping hammer 64 is shown to include a keyway track 66 for receiving a male keyway portion 68 of gasket or membrane 70. An adjustment screw 18 (not shown) is provided to cause the modified clamping hammer 64 to move inwardly and clamp and insulate (sound, vibration, etc.) a seam between the resilient gasket or membrane 56 and 70.

Figure 13:
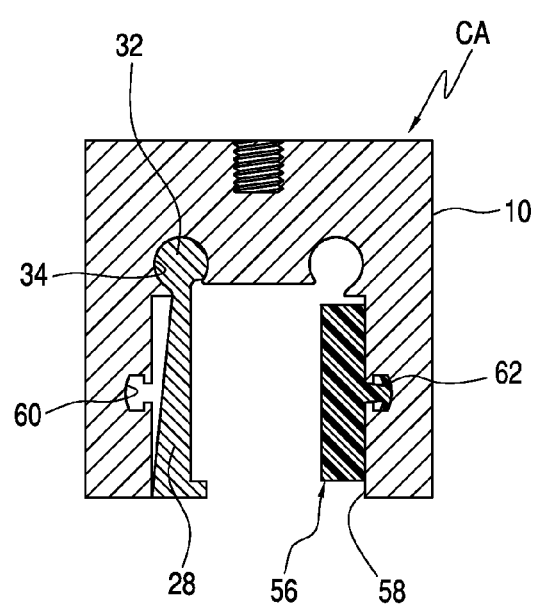
FIG. 13 is a cross-sectional view showing an alternative embodiment of one clamp according to the present invention having an isolation gasket or membrane to protect a roof or other structure from vibration, sound or the like or otherwise increase surface tension.

FIG. 13 is an alternative embodiment of FIG. 12 wherein a clamping hammer 28 as shown in FIGS. 2 through 5 is used in place of the modified clamping hammer 64 to clamp the seam (not shown) between a gasket or membrane 56 and the clamping hammer 28 by way of adjustment screws (not shown) and locking screws (not shown). As can be seen, the gasket or membrane 56 is provided with a key member 62 that interlocks with the interior wall 58 of U-shaped member 10 at female keyway 60.

Figure 14A:
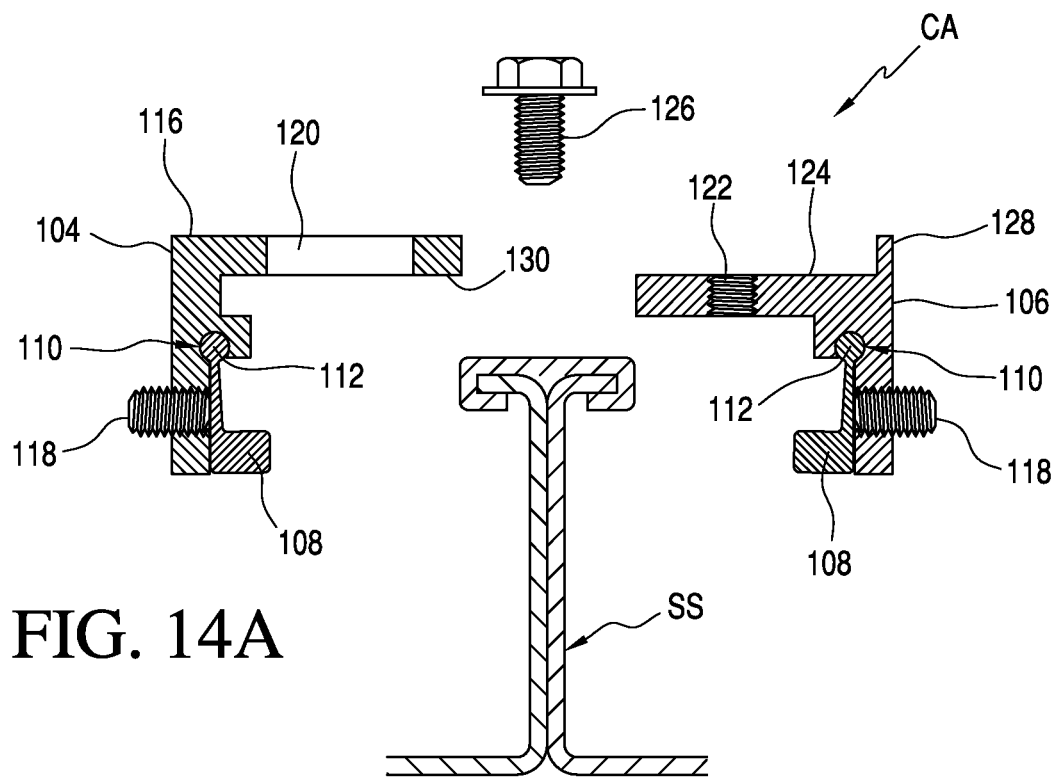
FIG. 14A is an exploded cross-sectional view showing an alternative embodiment of the clamp according to the present invention.

Turning to FIG. 14A, a clamp assembly provided with a two piece clamp body is shown. This embodiment is well adapted for attachment to relatively larger standing seams where the clamping hammers are sized or otherwise shaped such that a one piece clamp body is impractical or otherwise not well suited for the application. The clamp assembly CA is shown for attachment to a standing seam SS that is T-shaped. As is apparent, this embodiment is adapted to be connected to a standing seam other than a T-shaped seam or to some other upstanding member such as a joist, beam, etc. The clamp body 102 comprises a first portion 104 and second portion 106. Each of first portion 104 and second portion 106 may be of variable width depending upon the dimension of the standing seam SS to be clamped.

Figure 14B:
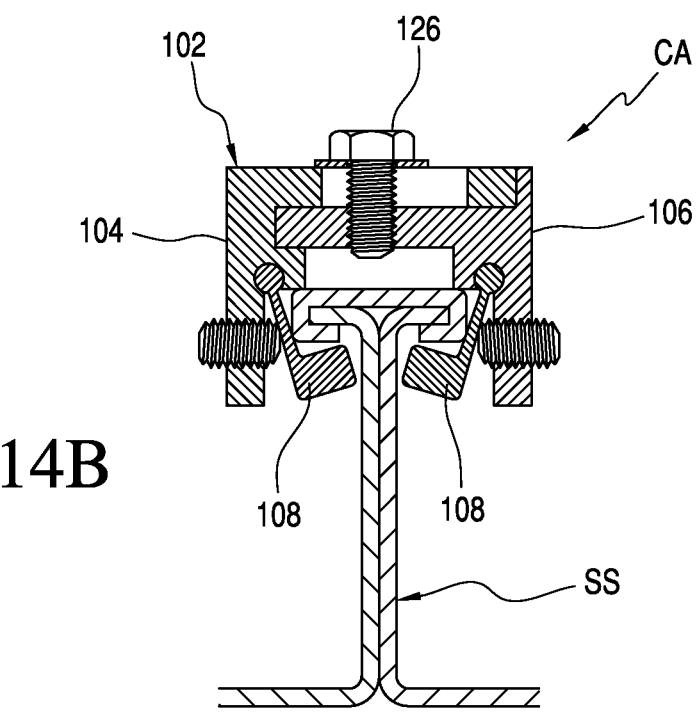
FIG. 14B is a cross-sectional view of the clamp shown in FIG. 14A when assembled and secured to a standing seam.

Each of first portion 104 and second portion 106 is provided with a separate one of a pair of movable jaws or hammers 108 that are shown to be generally L-shaped. As is apparent, the shape of the hammer is variable depending upon the specific application for the clamp. In the present embodiment, the lower portion of the hammer is increased in size so that it will effectively clamp against the underside of the T-shaped standing seam as best shown in FIG. 14B. The hammers 108 extend the length of the clamp portions 106 and 108 and are pivotally secured within the respective clamp portions at hinge member 30. As in the embodiments described earlier, hinge members 30 comprises a cylindrical member 112 provided on each hammer that is adapted to axially rotate within a cooperating groove that extends within each of clamp portions 106 and 108 and as shown in the figure. Adjustment screws 118 and locking screws (not shown) as set forth in the earlier noted embodiments are provided.

The top surface 116 of the first clamp portion 104 is provided with an aperture 120 having variable size that cooperates with a threaded aperture 122 provided in the top contact surface 124 of second clamp portion 106. A bottom contact surface 130 is provided on first clamp portion 104. Top and bottom contact surface will engage against each other when the clamp is in an assembled position as will be further explained below. An abutment 128 extends upwardly from second clamp portions 106 and functions as a stop member for limiting the width of the clamp when assembled and as best shown in FIG. 14B. It is within the scope of the present invention to not provide an abutment. A connecting member 126 shown in the figures to be a screw is provided and adapted to be received within apertures 120 and 122 to interconnect the two clamp portions and secure it to a standing seam as best shown in FIG. 14B. As is apparent, a washer of varying diameter may be provided to accommodate interconnection of the two clamp portions when a clamp having a relatively greater width is required.

The embodiment shown in FIGS. 14A and 14B reduce the width of the clamp body 102 from that which would otherwise be necessary if the clamp body were constructed from a single unitary piece. Accordingly, the clamp body in this embodiment is adapted to interconnect T-shaped standing seams of variable width without the need to provide several clamp bodies of varying widths. The first and second clamp portions may be machined or cut to any desired length. The clamp portions and the hammers may be constructed of any suitable material adapted to be shaped via extrusion, casting or injection molding.

Figure 15:
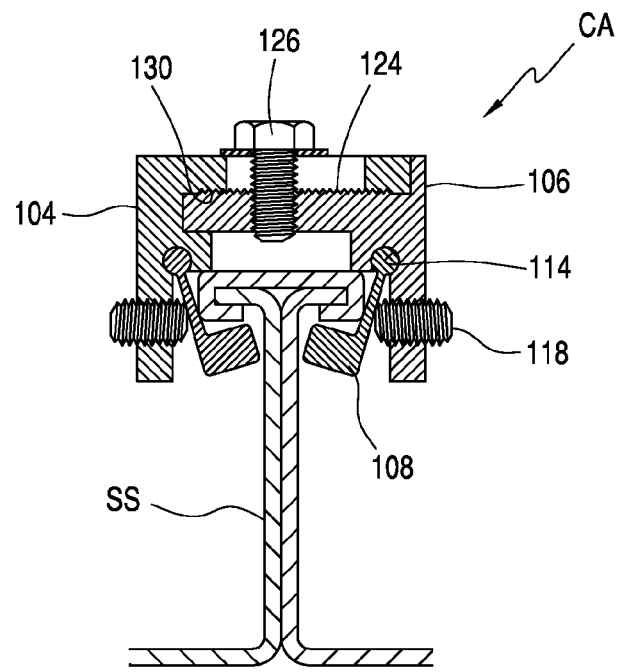
FIG. 15 is a cross-sectional view showing an alternative embodiment of the clamp shown in FIGS. 14A and 14B.

Turning to FIG. 15, an alternative embodiment of the clamp shown in FIGS. 14A and 14B is shown. In this embodiment, the top contact surface 116 and the bottom contact surface 130 are shown to be serrated or otherwise scoured or rendered not smooth. When the clamp is assembled, friction between the first clamp portion 104 and the second clamp portion 106 is increased and any lateral movement of the clamp portions relative to each other is prevented. Other means to enhance connection between the surfaces are within the scope of the present invention. For example, the top and bottom contact surface may be provided with a cooperating set of teeth of varying width and depth depending upon the application of use. The cooperating set of teeth are adapted to mesh together or otherwise interconnect so as to allow indexing of the clamp width.

Figure 16A:
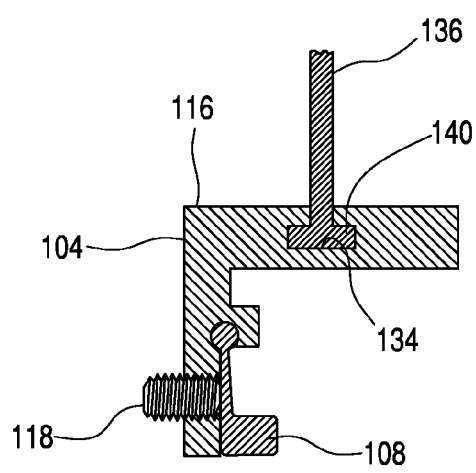
FIG. 16A is a cross-sectional view showing an alternative embodiment of the clamp shown in FIGS. 14A and 14B.
Figure 16B:
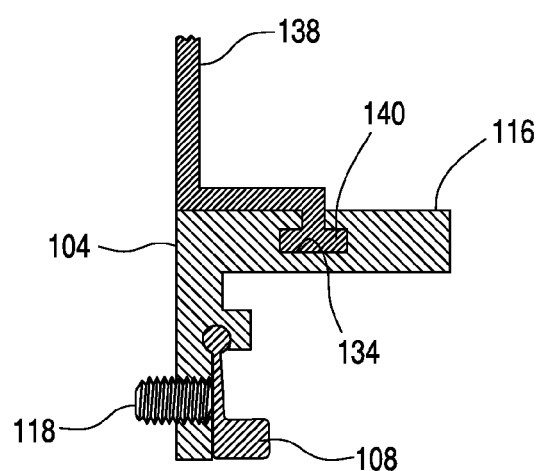
FIG. 16B is a cross-sectional view showing an alternative embodiment of the clamp shown in FIGS. 14A and 14B.

FIGS. 16A and 16B illustrate a further modification of the clamp shown in FIGS. 14A and 14B. In this embodiment, a T-shaped groove 134 is provided within the top surface 116 of the first portion 104 and extends longitudinally along the length of the clamp portion. The connecting member 118 and aperture 120 shown in the earlier embodiments are also provided, but are not shown in these figures. A straight extension member 136 (FIG. 16A) or an angled extension member 138 (FIG. 16B) are shown to extend upwardly from the top surface 116 of the first clamp portion 104. Each of the extension members 136 and 138 are provided with a T-shaped end portion 140 adapted or otherwise shaped to be received within the T-shaped groove as shown. The extension members may be used as supports for securing supplementary structures to the clamp after it has been secured to a standing seam. For example, a conduit or other object that needs to be run along the length of a roof. As is apparent, it is within the scope of the invention to vary the size and shape of the extension member depending upon the application required and to include one or more features of the embodiments noted above. It is also within the scope of the present invention to provide the T-shaped slot within a separate block as opposed to within the clamp body portion 104. The block is then secured to the top of the clamp portion by screws or other connection means. This enables the T-shaped slot to be varied relative to the clamp body. For example, it could be aligned transverse to the longitudinal axis of the clamp body.

FIGS. 17A and 17B illustrate another embodiment of the present invention where the location of the hinge members is reversed from that as shown in the previous embodiments together with an alteration of the hammer configuration. This embodiment expands the number of applications for which the clamp may be adapted and/or improves the ease-ability of clamping to certain standing seams.

Turning to FIGS. 17A and 17B, the clamp body 102 is shown to include an upper longitudinal groove 114 as depicted in the earlier described embodiments and a pair of lower longitudinal grooves 142 including a pair of recess portion 141 that are mirror images of each other. As is apparent, it is within the scope of the present invention to provide only lower longitudinal grooves if desired. Also, the clamp body 102 may be modified to increase its width or height or otherwise be provided with a greater mass so as to accommodate standing seams having a increased height or greater load requirements. The reverse hammer 144 is shown to have a generally S-shaped configuration as opposed to the generally L-shaped configuration of the above noted embodiments. Each reverse hammer 144 is provided with a horizontally extending cylindrical member 112 similar to that described above with respect to the earlier embodiments and in addition, a head portion 146 for contacting against a standing seam to be clamped. A leg portion 148 extends between and interconnects the cylindrical member to the head portion. As is apparent, it is within the scope of the present invention to provide the reverse hammer with a shape other than an S-shape depending upon the application of use.

As best shown in FIG. 17A, the recess portions 141 of the clamp body 102 are adapted to receive the head portion 146 of each of the hammers 142 so that a standing seam SS may be received within the interior of the clamp body prior to clamping. Turning to FIG. 17B, the device is shown clamping a seam whereby the adjustment screws 118 are turned inwardly to cause the head portion of each hammer to move inwardly and engage against a standing seam. Once the seam has been properly engaged, the locking screws (not shown) are sufficiently turned so that the hinge member for each hammer is fixed in its position.

FIG. 18 discloses an embodiment where the clamping hammers adapted to be secured to a standing seam SS and where the sides of the seam are of unequal height. In this embodiment, a standing seam SS has a first side 150 of a first height and a second side 152 having a height great than that of the first side. Seam lips 154 are provided and cooperate to form a seam head. The sides 14 of the clamp body 102 provided with a height that corresponds to the respective sides of the seam. In addition, each of the clamping hammers 28 are provided with a height that corresponds to the height of either the first side 150 or the second side 152 of the clamp. As can be seen, the adjustment screws 118 are positioned at different clamp heights to correspond with the height of the respective clamping hammer.

FIGS. 19 and 20 disclose a further embodiment where the clamping hammers have an unequal height. In this embodiment the standing seam SS is L-shaped and the hammers are adapted to provide a uniform clamping force against the seam. The shorter clamping hammer 156 is shown in the figures to engage the seam just under the seam lip whereas the clamping hammer 158 having a greater length is shown to engage the seam a distance below that of clamping hammer 156. Clamping hammer 158 provides more clearance when the clamping assembly is placed onto a seam to be clamped. This embodiment also allows for a more uniform clamping force to be provided against the seam than would otherwise be the case if the hammers were the same length. In addition, two sets of grooves 114 are provided within the clamp body 102. In this way, the clamp assembly CA is adapted to engage an L-shaped standing seam SS including a seam lip oriented transverse to either side of the standing seam.

Figure 21:
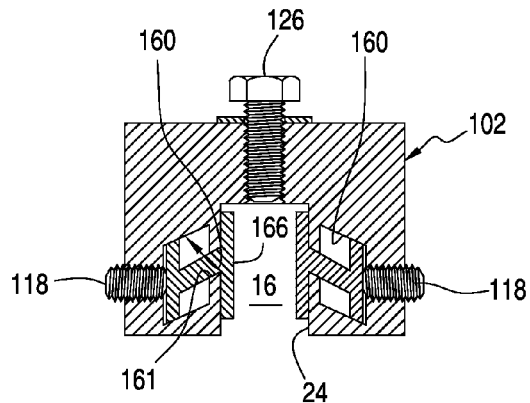
FIG. 21 is a cross-sectional view showing an alternative embodiment of the clamp according to the present invention.
Figure 22:
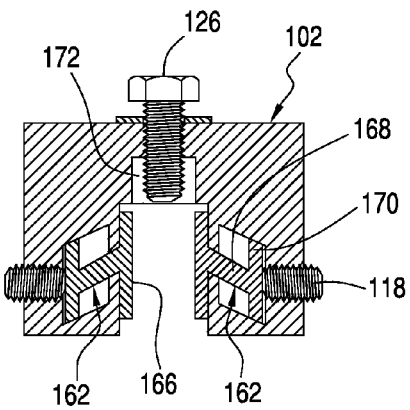
FIG. 22 is a cross-sectional view showing an alternative embodiment of the clamp shown in FIG. 21.

Turning to FIGS. 21 and 22 a gravity clamping hammer adapted to slide perpendicular toward a standing seam under action of the set screws and lock the clamp to a standing seam. When the set screws are loosened, clamping hammer will recede away from the seam due to gravitational forces. The clamp body 102 is provided with a pair or cooperating recesses 160 that extend the longitudinal axis of the clamp body 102 and have a general configuration in cross-section of a parallelogram. A slot 161 is provided within each of the side walls 24 of the interior region 16 to provide an opening between the clamp interior region 16 and the recesses 160. A clamping hammer 162 is disposed within each recess 160. The clamping hammer 162 comprises a head portion 166, neck 168 and end portion 170. The opposite ends of the clamp body may be staked or pinned to prevent the clamping hammer from sliding out of the clamp body.

In operation, when the adjustment screws are turned clockwise, it moves inwardly and impinges upon the end portion 170 of the clamping hammer 162. This causes the clamping hammer to slide perpendicular toward the standing seam to clamp the same. To loosen the clamp, the adjustment screws 118 are turned counterclockwise whereby the clamps slide away from the standing seam under the force of gravity. FIG. 21 illustrates an embodiment whereby the clamp body 102 may be machined to provide a upper recess so as to accommodate a standing seam having a greater height. Clamp body 102 may be manufactured by extrusion, casting or injection molding and the gravity-type clamping hammers 162 may be manufactured in a variety of sizes and lengths and from a number of materials, including, but not limited to, metal, elastomeric rubber, DELRIN or other thermoplastics having high stiffness, high or low friction and excellent dimensional stability.

Figure 23:
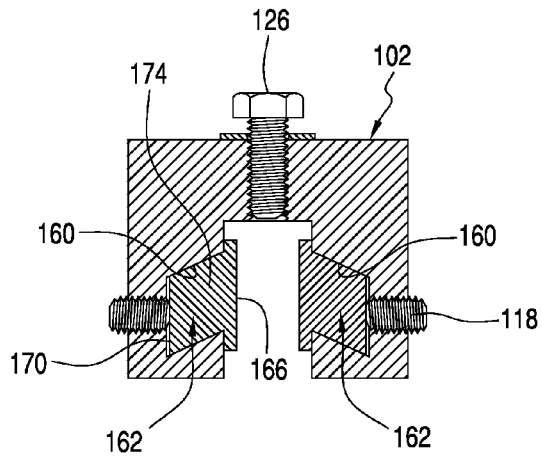
FIG. 23 is a cross-sectional view showing an alternative embodiment of the clamp shown in FIG. 21.

FIG. 23 illustrates an alternative embodiment of the invention shown in FIGS. 21 and 22. In this embodiment, the slot associated with the recesses 160 is removed and the entire inward face of the recess 160 is opened to receive a clamping hammer 162 having an expanded neck portion 174 that generally occupies the entire recess 160. A head portion 166 is also provided to engage against a standing seam.

Figure 24:
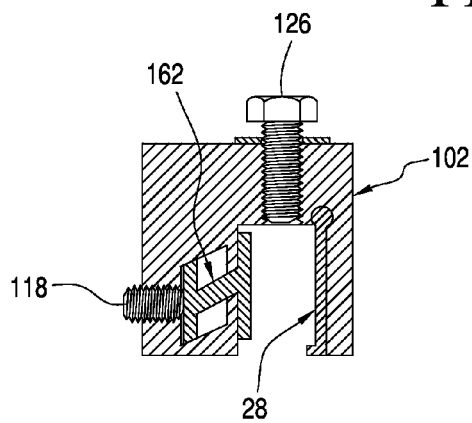
FIG. 24 is a cross-sectional view showing an alternative embodiment of the clamp shown in FIG. 21.
Figure 25:
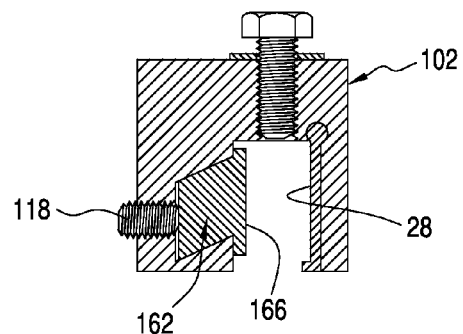
FIG. 25 is a cross-sectional view showing an alternative embodiment of the clamp shown in FIG. 21.

FIGS. 24 and 25 disclose alternative embodiments of the invention shown in FIGS. 21 through 23. FIG. 24 discloses a clamp body that combines a gravity type clamping hammer 162 as set forth in FIG. 22 in combination with a clamping hammer 28 as disclosed in FIG. 2. A second adjustment screw is not provided for hammer 28. FIG. 25 discloses a clamp body that combines a gravity type clamping hammer 162 as set forth in FIG. 23 in combination with a clamping hammer 28 as set forth in FIG. 2. A second adjustment screw (not shown) may be provided for hammer 28.

FIG. 26 discloses another embodiment of the present invention that includes detent type hammers or blocks instead of pivoting or gravity hammers. A cooperating pair of hammers or blocks 176 is shown retained within a generally C-shaped recess or cavity forming the interior region of the clamp body 102. The detent type hammer or block 176 may be manufactured by extrusion, casting or injection molding and in a variety of sizes and lengths and from a number of materials, including, but not limited to, metal, elastomeric rubber, DELRIN or other thermoplastics having high stiffness, higher or low friction and excellent dimensional stability. Adjustment screws 118 extending transverse to the longitudinal axis of the block are rotated and contact block 176 to urge it inwardly against a standing steam clamp (not shown). Once both blocks have adjusted against a standing seam clamp, pair of locking members 178 shown to be screws or detents are engaged to force a downward pressure against the aligned block thereby locking it into place. It is within the present invention to provide a groove in block 176 that is aligned perpendicular to the longitudinal axis of the hinge groove 34 for receiving the locking member 178. This assists in retaining the block within the clamp body and preventing it from falling out until clamped against the seam.

FIG. 27A discloses a further embodiment whereby a single elongated shaped block 176 is provided to engage against an L-shaped standing seam (not shown). FIG. 27B discloses another embodiment whereby a single elongated shaped block 176 is provided to engage against a vertical standing seam having no head portion (not shown). The clamp body 102 is not provided with a single L-shaped leg member 180 with the opposite leg member 182 shown to be generally planar.

FIGS. 28A and 28B are directed to a further embodiment of the present invention whereby the clamp body is spring loaded to retain a detent block within the interior region of the clamp body. FIG. 28A discloses a detent block that has been shaped at the top and bottom regions to allow it to pivot inwardly when engaged by an adjustment screw 118. As can be seen, the bottom edges 184 of detent block 176 is tapered inwardly to provide a pivot point at the bottom of the block. The upper portion of the detent block 176 is provided with a through-hole 186 through which a retaining rod 188 is inserted, the rod being secured at both ends to the sides of the clamp body. A rod is threaded through a spring member 190 and is sized within the interior of the clamp body such that it will urge the detent block 176 into an open position as shown in FIG. 28A. A clamping hammer 28 is provided opposite the detent block. As best shown in FIG. 28B, when the adjustment screw 118 is rotated clockwise, it is caused to impinge against the detent block 176 and cause it to pivot inwardly against the force of the spring to engage a standing seam (not shown). The spring ensures the block will always return to a open position away from the standing seam when the adjustment screws are unscrewed and be prevented from falling out of the clamp body. A locking screw as shown in FIG. 26 may be provided to lock the clamp into place after engaging a standing seam.

FIG. 29A is another embodiment of the present invention and discloses hinged pivoting hammers 190 that operate in the manner as disclosed earlier but the hammers slide in the ends of the clamp. The head portion 192 of each hammer is custom shaped to match and engage the contours of the standing seam SS. FIG. 29B is an alternative embodiment that provides a non-hinged detent block 194 the interior surface of which is custom shaped to match and engage the contours of the standing seam SS. A pair of locking screws is also provided.

Figure 35:
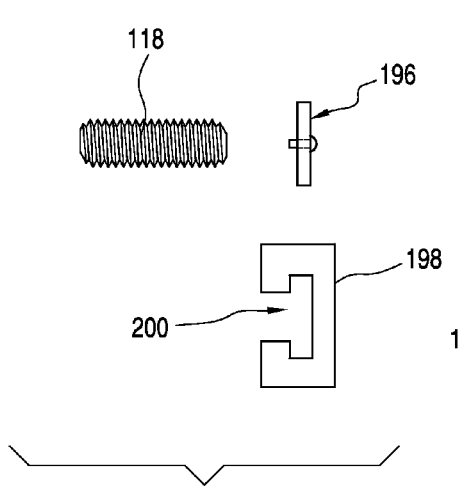
FIG. 35 is an exploded cross-sectional view of an alternative embodiment according to the present invention.
Figure 36:
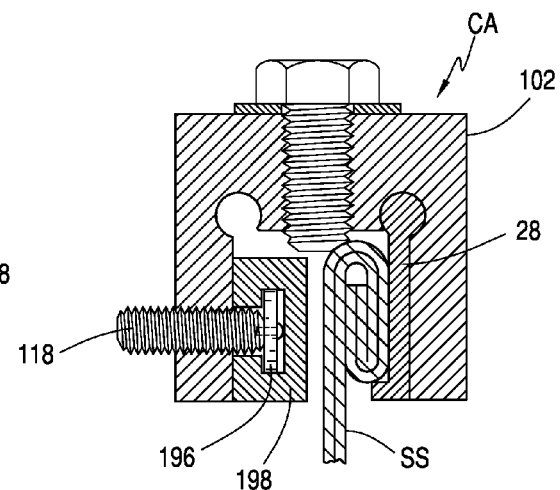
FIG. 36 is a cross-sectional view of a clamp fitted with the clamping structure shown in FIG. 35 and prior to being secured to a standing seam.
Figure 37:
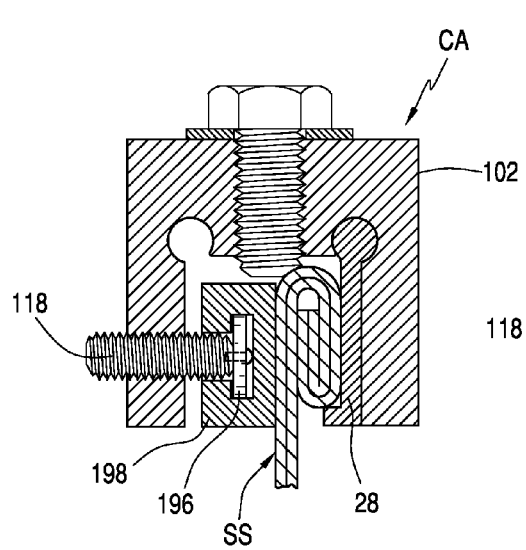
FIG. 37 is a cross-sectional view of the clamp shown in FIG. 36 when clamped to a standing seam.
Figure 38:
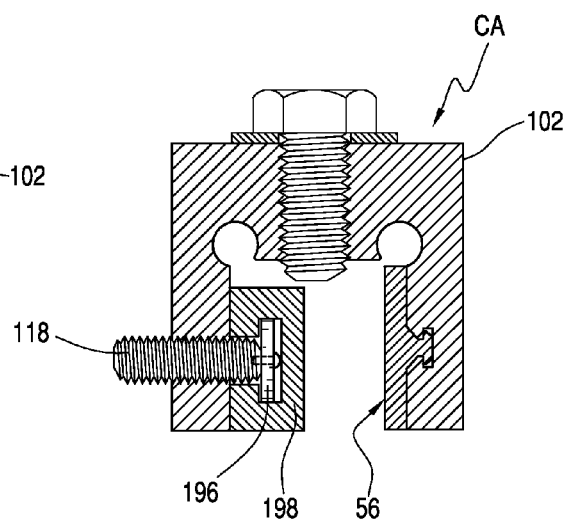
FIG. 38 is an alternative embodiment of the clamp shown in FIG. 36.

FIGS. 35 through 38 disclose an alternative embodiment of the present invention. Turning to FIG. 35, a washer and rivet 196 is provided to retain a fastener 198 in place and prior to actuation of the adjustment screw 118. The fastener 198 is provided with a T-shaped recess adapted to receive the washer and rivet 196. Fastener 198 is made with enough tolerance within the T-shaped recess so as to allow it to pivot about the washer. This enable fastener 198 to adapt to seams that may be out of plane or otherwise be slightly angled along the longitudinal axis. The range of pivot of fastener 198 compensates for slight variations in the plane of the seam by matching the slight angular differences. It is further noted that a gasket of other type of device may be applied to the fastener 198 to create a better contact surface having higher shear. FIG. 36 illustrates the entire clamp assembly for this embodiment. All of the adjustment screws 188 are rotated inwardly to align the washer and rivet 196 so that the fastener 198 can be slid over each of the washers to align it within the interior of the clamp body. As best seen in FIG. 37, the adjustment screws 118 are further rotated to urge the faster against the head of a standing seam SS to clamp the same. In the alternative, the washer and rivet 196 may be replaced with a freely spinning nut member to secure the washer to the end of the screw member 118. FIG. 38 illustrates a further embodiment where the clamping hammer is replaced with a gasket 56 which is received within a keyway track for receiving a male keyway portion of the gasket. Clamp body 102 may be manufactured by extrusion, casting or injection molding and the fastener 198 may be manufactured in a variety of sizes and lengths and from a number of materials, including, but not limited to metal, elastomeric rubber, DELRIN or other thermoplastics having high stiffness, high or low friction and excellent dimensional stability and as noted earlier.

Figure 30:
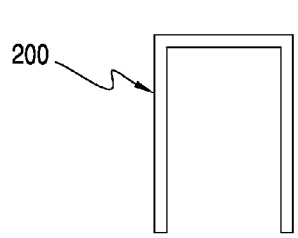
FIG. 30 is an end view showing a tool according to the present invention for use when assembling a clamp to a standing seam.
Figure 31:
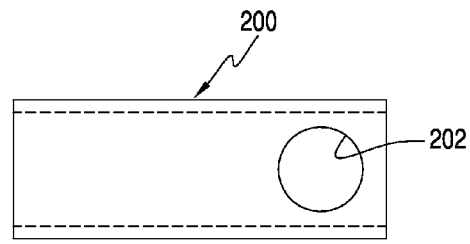
FIG. 31 is a top view of FIG. 30.
Figure 32:
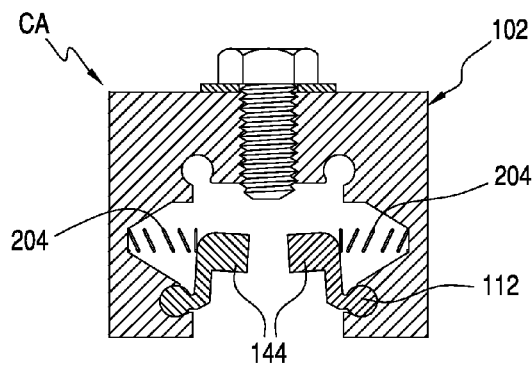
FIG. 32 is a cross-sectional view showing an alternative embodiment of a clamp according to the present invention.
Figure 33:
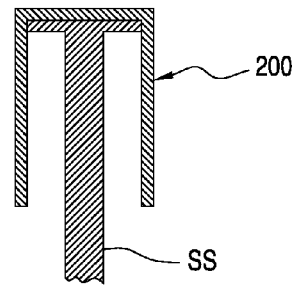
FIG. 33 is a cross-sectional view showing the tool in FIGS. 30 and 31 fitted over a standing seam to be clamped.
Figure 34A:
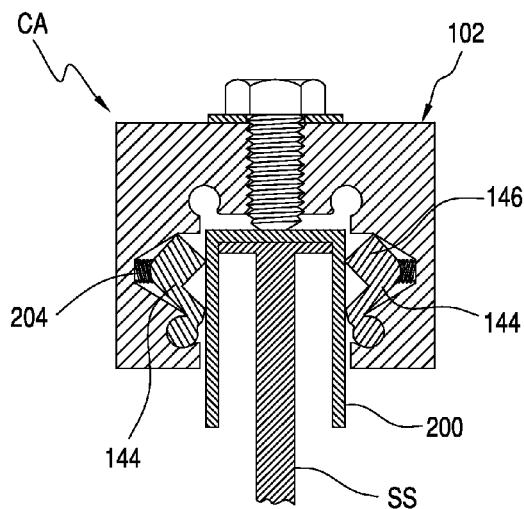
FIG. 34A is a cross-sectional view showing the tool shown in FIGS. 30 and 31 in use with the clamp shown in FIG. 32.
Figure 34B:
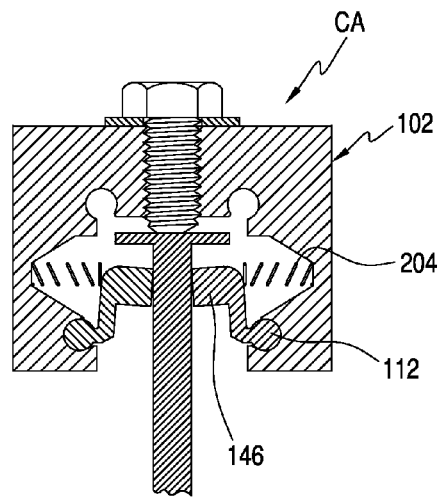
FIG. 34B is a cross-sectional view of FIG. 34 after the tool has been removed and the clamp is secured against a standing seam.

FIGS. 30 through 34B disclose another embodiment of the present invention and in particular a tool application for using a spring loading the clamp member. FIGS. 30 and 31 illustrate the tool member 200 shown to comprise a generally U-shaped member provided with a finger hole 202. As best shown in FIG. 33, the tool 200 is adapted to be slid over a standing seam SS to be clamped. FIG. 32 illustrates the clamp embodiment shown in FIGS. 17A and 17B but having the clamping hammers loaded using a pair of spring member 204 with the use of adjustment screw 118 (not shown) to tightly clamp the hammers against a seam. It is within the scope of the present invention to not employ adjustment screws if the specific application does not require them. After the standing seam is covered by the tool 200, the user slides the clamp assembly CA over the top of the tool 200 and as best shown in FIG. 34A which in turn causes the spring loaded hammers to be pushed out of the way and into an open position so that the standing seam can be received within the interior region of the clamp. Once the clamp is in place, the user will pull the tool 200 from the interior of the clamp by grasping the finger hole 202. As shown in FIG. 34B, the spring loaded hammers are urged into engagement against the sides of the standing seam to clamp the same.

Figure 39:
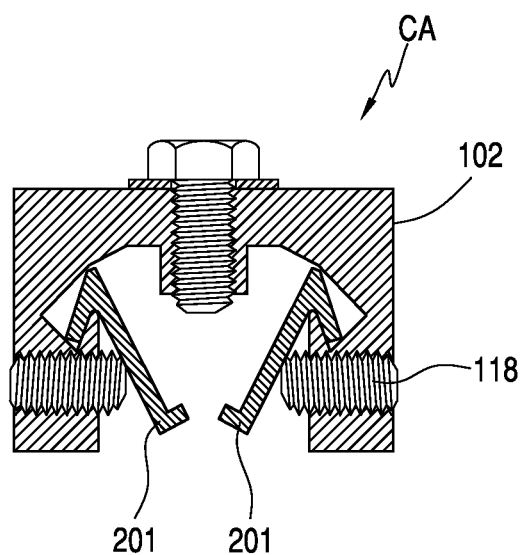
FIG. 39 is a cross sectional view showing another embodiment of the clamp according to the present invention.

FIG. 39 illustrates another embodiment of the present invention wherein the body 102 of the clamping assembly CA is provided with a pair of notches that extend along the longitudinal axis of the clamp body so as to receive a clamping hammer 201 that is provided with a hook member at one end which is received within a notch and is adapted to pivot inwardly or outwardly under action of the adjustment screw 118.

It is within the scope of the present invention to vary the use of adjustment and locking screws depending upon the end use of the clamp. In some situations a locking screw may not be necessary and the force of the adjustment screw is sufficient to lock the clamp onto the seam. The use of multiple locking screws has been seen to reduce any vibration of the clamp due to conditions during use. As is apparent, in all embodiments the clamp body 102 and all components of the assembly may be manufactured by extrusion, casting or injection molding and the various clamp components may be manufactured in a variety of sizes and lengths and from a number of materials, including, but not limited to metal, elastomeric rubber, DELRIN or other thermoplastics having high stiffness, high or low friction and excellent dimensional stability and as noted earlier. The clamp body and all components forming the clamp assembly may be machined and milled as required in order to adapt it to its specific end use. The embodiments employing gaskets can be provided with hinges and without employing adjustment screws. It is also within the scope of the present invention to interconnect two or more clamps that are aligned parallel to each other with a bridge member secured at each end to a separate clamp. The bridge member may be constructed from any suitable material including, but not limited to, aluminum, stainless steel, etc. The bridge member would allow for the optional attachment of rooftop assembly devices such as fall protection structure, gutters, etc.

While this invention has been described as having a preferred design, it is understood that it is capable of further modifications, uses and adaptations, both in whole and in part, while following the general principle of the invention and including such departures from the present disclosure as is known or customary practice in the art to which this invention pertains, and as may be applied to the central features of this invention.

I claim:

1. A clamping assembly comprising:
   a) a clamp body having an interior region for receiving a structure to be clamped, the clamp body comprising first and second generally L-shaped clamp portions, the first and second clamp portions are adjustably interconnected to form a generally U-shaped clamp body of variable width;
   b) at least one clamping hammer disposed within the interior region of the clamp body, the clamping hammer is hingedly secured to the clamp body along the longitudinal axis thereof;
   c) at least one adjustment screw extending through the clamp body and adapted to selectively impinge against the clamping hammer so as to cause it to pivot about its longitudinal axis, the adjustment screw extending transverse to the longitudinal axis of the clamping hammer; and
   d) at least one locking screw adapted to selectively impinge against the clamping hammer to prevent pivoting of the same whereby a standing seam or other structure to be clamped that is received within the clamp body may be tightly clamped by the clamping hammer under action of the adjustment screw and locked into place by the locking screw.

2. A clamping assembly as in claim 1 wherein the clamp body comprises a top wall and a pair of side walls, the side walls aligned as mirror images and the top wall and side walls having interior and exterior surfaces respectively.

3. A clamping assembly as in claim 2 and further comprising a second clamping hammer, the at least one clamping hammer and the second clamping hammer are aligned as mirror images and disposed within the interior region of the clamp body.

4. A clamping assembly as in claim 2 and further comprising a second adjustment screw, the at least one adjustment screw and the second adjustment screw extend through one of the pair of side walls and into the interior region of the clamp body.

5. A clamping assembly as in claim 3 wherein each of the at least one adjustment screw and the second adjustment screw extends through a separate one of the pair of side walls and are aligned along a common longitudinal axis.

6. A clamping assembly as in claim 2 and further comprising a threaded aperture, the threaded aperture extends into the exterior surface of at least one of the clamp body top wall and side walls.

7. A clamping assembly as in claim 3 and further comprising:
   a) at least one cylindrical recess, the at least one cylindrical recess extends into the interior surface of the top wall and is adjacent one of the side walls and extends along the longitudinal axis of the clamp body; and
   b) the at least one clamping hammer having at one end thereof a cylindrical hinge member that is received within the at least one cylindrical recess such that the at least one clamping hammer is hingedly movable between the side walls.

8. A clamping assembly as in claim 7 and further comprising:
   a) a second cylindrical recess, the second cylindrical recess extends into the interior surface of at least one of the top wall or side walls and extends along the longitudinal axis of the clamp body; and
   b) the second clamping hammer having at one end thereof a cylindrical hinge member that is received within the second cylindrical recess so that the second clamping hammer is hingedly movable between the side walls to clamp a standing seam or other structure therebetween.

9. A clamping assembly as in claim 3 wherein the at least one clamping hammer and the second clamping hammer are generally L-shaped in cross-section.

10. A clamping assembly as in claim 8 and further comprising a second locking screw, the second locking screw extends through one of the side walls and is transverse to the longitudinal axis of the second clamping hammer such that the second locking screw is adapted to selectively impinge upon the cylindrical hinge member of the second clamping hammer and prevent pivoting of the same.

11. A clamping assembly as in claim 7 wherein the at least one locking screw extends through one of the side walls and is transverse to the longitudinal axis of the at least one clamping hammer such that the screw is adapted to selectively impinge upon the cylindrical hinge member and prevent pivoting of the same.

12. A clamping assembly as in claim 3 wherein one of the at least one clamping hammer and second clamping hammer are generally step-shaped in cross-section.

13. A clamping assembly as in claim 3 wherein the at least one clamping hammer and the second clamping hammer are shaped to accommodate therebetween the head portion of a standing seam to be clamped.

14. A clamping assembly as in claim 3 and further comprising an elastomeric material, the elastomeric materials is secured to one of the at least one clamping hammer and second clamping hammer.

15. A clamping assembly as in claim 2 and further comprising:
   a) at least one threaded fastener, the threaded fastener interconnects the first and second clamp portions.

16. A clamping assembly as in claim 15 and wherein the at least one fastener extends through the clamp body top wall.

17. A clamping assembly as in claim 1 and wherein one of the first and second clamp portions is provided with a slot for receiving the other of the first and second clamp portions.

18. A clamping assembly as in claim 1 and wherein one of the first and second clamp portions is provided with an abutment for engagement against the other of the first and second clamp portions.

19. A clamping assembly as in claim 1 and wherein the first and second clamping portions are provided with serrated surfaces to enhance contact between the first and second clamping portions.

20. A clamping assembly as in claim 1 and wherein one of the first and second clamping portions is provided with at least one slot that extends the longitudinal axis of the clamp body, the slot is adapted to receive an extension member to which a support may be secured.

21. A clamping assembly comprising:
   a) a clamp body formed by first and second overlapping portions aligned along a common longitudinal axis, the clamp body has a top wall, a pair of side walls and an interior region therebetween;

b) a pair of clamping jaws, the clamping jaws are disposed within the interior region and each jaw of the pair of clamping jaws is hingedly secured to the clamp body and adjacent a separate one of the pair of side walls to restrict pivoting to within the interior region;

c) at least first and second adjustment screws, the first adjustment screw extends through one wall of the pair of side walls to selectively engage against one of the clamping jaws and cause pivoting of the same toward the opposite of the pair of clamping jaws, the second adjustment screw extends through a separate wall of the pair of side walls to selectively engage against a separate one of the clamping jaws and cause pivoting of the same toward the opposite of the pair of clamping jaws, the first and second adjustment screws are transverse to the longitudinal axis of the clamp body; and d) at least first and second locking screws, each one of the first and second locking screws extends through a separate one of the pair of side walls to selectively impinge against one of the clamping jaws where it is hingedly secured to the clamp body and to prevent pivoting of the same whereby a structure to be clamped that is received within the interior region may be clamped between the pair of locking jaws under action of the first and second adjustment screws and locked into place by the first and second locking screws.

22. A clamp assembly as in claim 21 and further comprising additional adjustment screws and locking screws.

23. A clamp assembly as in claim 21 and further comprising a threaded aperture, the threaded aperture extends into the top wall.

24. A clamp assembly as in claim 21 wherein each jaw of the pair of clamping jaws is generally L-shaped in cross-section and aligned within the interior region of the clamp body as a mirror image of the other of the pair of clamping jaws.

25. A clamping assembly as in claim 21 wherein each jaw of the pair of clamping jaws is shaped to accommodate the head portion of a standing seam.

26. A clamping assembly as in claim 21 and wherein each clamping jaw of the pair of clamping jaws having at one end thereof a cylindrical hinge member adapted to pivotally engage a cylindrical recess extending within the clamp body and above the side wall to which it is adjacent.

27. A clamping assembly as in claim 21 and further comprising:
a) at least one threaded fastener, the threaded fastener interconnects the two piece clamp body.

28. A clamping assembly as in claim 15 and wherein the at least one fastener extends through the clamp body top wall.

29. A clamping assembly as in claim 1 and wherein the two piece clamp body is provided with a slot for interconnecting the two pieces that form the clamp body.

30. A clamping assembly as in claim 1 and wherein one of the two pieces that form the clamp body is provided with an abutment for restricting the width of the clamp body.

* * * * *